United States Patent [19]
Chmela et al.

[11] 3,974,369
[45] Aug. 10, 1976

[54] IMPULSE OPERATING FLASHING BEACON

[76] Inventors: John F. Chmela, 1106 Beechwood Drive, Mount Prospect, Ill. 60070; Lee M. Manna, 315 Lincolnwood, Highland Park, Ill. 60035

[22] Filed: July 22, 1974

[21] Appl. No.: 490,330

[52] U.S. Cl. .............................. 240/6.4 R; 46/58; 240/7.55; 240/10.1
[51] Int. Cl.² ...................... F21L 15/00; B62J 5/00
[58] Field of Search .......... 240/7.55, 58, 49, 108 D, 240/6.4 R, 22, 23, 24, 10 R, 10.1, 6.42, 7.5; 46/53, 58; 280/289; 340/134

[56] References Cited
UNITED STATES PATENTS

| 214,895 | 4/1879 | DuFour | 46/53 |
| 582,167 | 5/1897 | Bernheimer | 240/7.55 |
| 1,659,346 | 2/1928 | Beatty | 240/6.42 |
| 1,711,932 | 5/1929 | Terreby | 240/49 |
| 2,857,507 | 10/1958 | Stec | 240/10.1 |
| 2,923,088 | 2/1960 | Peretti | 46/58 |
| 3,696,334 | 10/1972 | Demeter | 340/134 |

*Primary Examiner*—L. T. Hix
*Assistant Examiner*—E. M. O'Connor
*Attorney, Agent, or Firm*—Dominik, Knechtel, Godula & Demeur

[57] ABSTRACT

An impulse operating flashing beacon which is an open scroll impulse turbin that rotates due to reaction with air molecules. The beacon includes an elongated shaft which is adapted at one end to be affixed to a portion of a bicycle or the like and carries at its other end a source of light and a rotatably mounted vane or impeller which is caused to rotate as air molecules are impinged on it to reflect light emitted from the source of light in a flashing manner.

6 Claims, 4 Drawing Figures

IMPULSE OPERATING FLASHING BEACON

This invention relates to an impulse operating flashing beacon.

The impulse operating flashing beacon of the invention is particularly applicable for use on bicycles and the like, for both decorative and safety purposes. The flashing beacon includes an elongated shaft which is adapted at one end to be affixed to a portion of the bicycle and carries at its other end a source of light and a rotatably mounted vane which is caused to rotate as air molecules are impinged on it to reflect light emitted from the source of light in a flashing manner. The beacon therefore serves as an ornament for the bicycle, and more importantly as a safety signal, particularly when riding at night.

The construction of the flashing beacon also is such that is can be packaged and shipped knocked down, and then easily and quickly assembled by the purchaser. Accordingly, the cost of the flashing beacon can be substantially reduced, in comparison to an arrangement which would have to be fully assembled prior to shipment.

Accordingly, it is an object of the present invention to provide an improved impulse operating flashing beacon.

The above-mentioned and other objects and features of this invention and the manner of obtaining them will become more apparent, and the invention itself will be best understood, by reference to the following description in the embodiment of the invention taken in conjunction with the accompanying drawings wherein.

Figure 1:
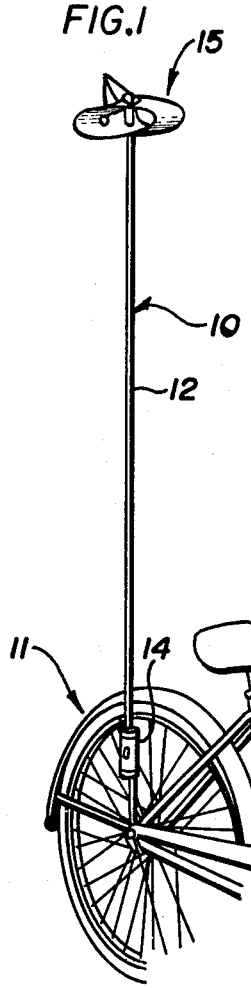
FIG. 1 is a partial perspective view generally illustrating the flashing beacon of the invention affixed to the rear portion or frame of a bicycle.
Figure 2:
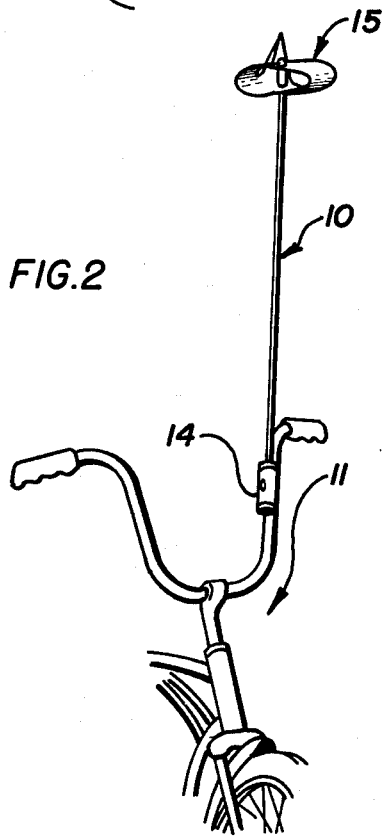
FIG. 2 is a partial perspective view generally illustrating the flashing beacon affixed to the handle bar of a bicycle.
Figure 3:
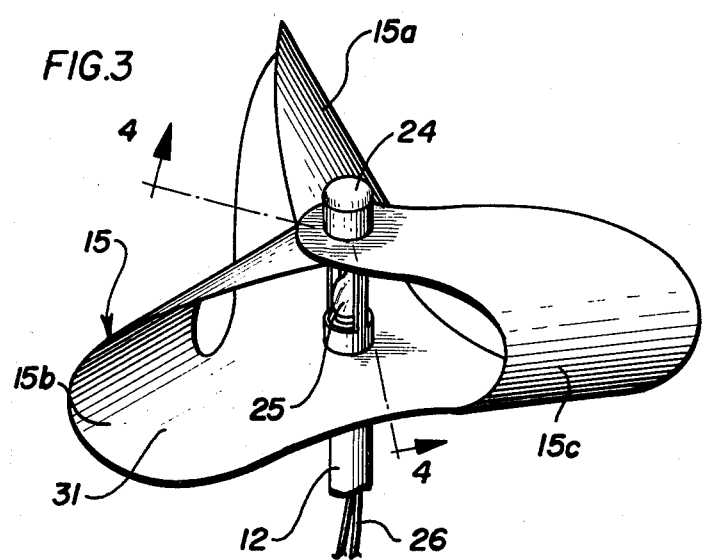
FIG. 3 is a perspective view generally illustrating the arrangement and construction of the rotating vane and FIG. 4 is a sectional view taken generally along lines 4—4 of FIG. 3.

Referring now to the drawing, in FIGS. 1 and 2, an impulse operating flashing beacon 10 exemplary of the present invention is illustrated affixed to the rear portion or frame and to the handle bars of a bicycle 11, respectively. The flashing beacon 10 includes an elongated shaft 12 having a battery housing 14 affixed to its one end and the rotating vane 15 affixed to its opposite end. The shaft 12 also carries on its upper end a source of light such as the light bulb 25 (FIG. 4), with the light bulb preferably and advantageously being disposed with respect to the rotating vane 15 in a central axial position. The arrangement and construction is such that the vane 15 rotates when air molecules are impinged upon it as, for example, when the bicycle is being pedaled down the street, and in so rotating the vane 15 reflects the light emitted by the light bulb 25 in a flashing manner.

More specifically, the flashing beacon 10 has a shaft 12 which, in the illustrated embodiment, is affixed to one end of the battery housing 14 by, for example, extending the one end of the shaft 12 into a hole in the end of the battery housing 14 and securing the shaft therein. Alternatively, the battery housing 14 can be attached to the shaft 12, in any suitable fashion. While the shaft 12 may be of wood or other suitable material, preferably and advantageously the shaft 12 is plastic and is of a hollow construction. The hollow plastic shaft 12 has the advantage that the electrical conductors 62 coupling the source of power (batteries) contained within the battery housing 14 to the light bulb 25 for the purpose of energizing the latter, can be extended through the hollow core of the shaft 12. Therefore, it is less likely that the electrical conductors 26 will be inadvertently cut or otherwise damaged.

Figure 4:
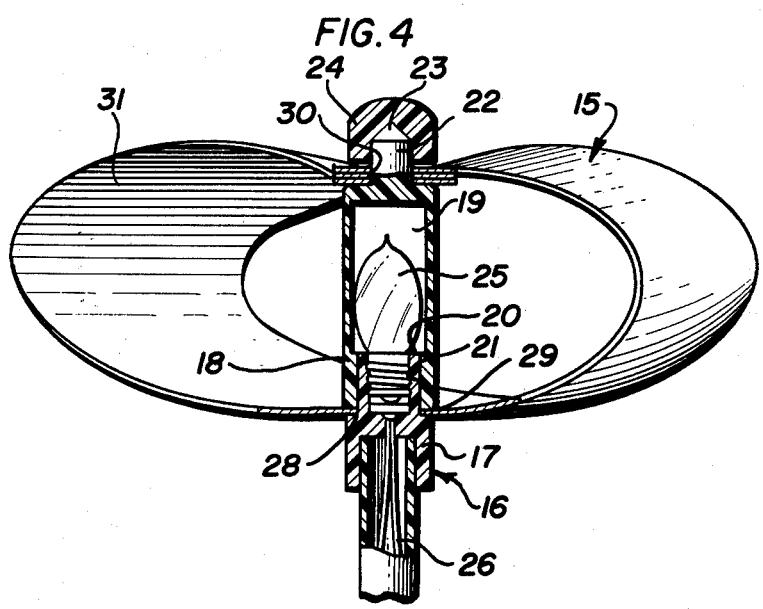
Figure 4:
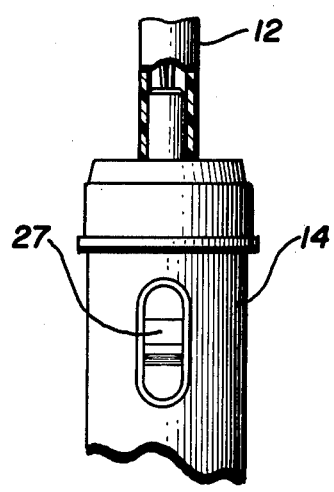

As can be best seen in FIG. 4, a bulb housing 16 is frictionally or otherwise secured to the end of the shaft 12. This bulb housing 16 is formed to receive the light bulb 25 therein, together with the appropriate electrical connectors for establishing a connection between the light bulb 25 and the batteries contained within the battery housing 14. The bulb housing 16 has a reduced diameter portion 20 forming a shoulder 28 about the side wall of the bulb housing 16.

A coupler 18 has a bore 21 extending through its one end which is positioned to frictionally receive therein the reduced diameter portion 20 on the bulb housing 16. The coupler 16 also has an open cavity 19 formed therein, and the light bulb 25 is disposed within this open cavity 19 so that light emitted by the light bulb 25 can impinge on the vane 15. A reduced diameter stud 22 is formed on the upper end of the coupler 18, as illustrated, and this stud 22 preferably and advantageously is provided with a conical tip 23. An end cap 24 is adapted to be frictionally received on this reduced diameter stud 22.

The vane 15 can be of any suitable material including metal, however, preferably and advantageously it is formed of plastic sheet material which is cut to form an odd number of equally spaced radially extending vane members. In the illustrated embodiment, the vane 15 is formed with three vane members 15a, 15b and 15c. A hole 29 proportioned to frictionally receive therethrough the reduced diameter portion 20 of the bulb housing 16 is formed in the plastic sheet material centrally and axially with respect to the vane members 15a–15c. Also, a hole 30a, 30b and 30c, collectively indicated in FIG. 4 by the reference numeral 30, is formed in the respective vane members 15a–15c, adjacent the terminal ends thereof. These holes 30a, 30b and 30c are proportioned to frictionally receive therethrough the stud portion 22 on the end of the coupler 18. A reflective coating is spray painted or otherwise deposited on one surface of the plastic sheet material forming the vane 15. The other surface preferably is colored for attracting attention in day light.

The vane 15 is assembled on the end of the shaft 12 by first extending the reduced diameter portion 20 on the bulb housing 16 through the hole 29 in the vane 15. The coupler 18 then is affixed to the bulb housing 16, by extending the reduced diameter portion thereof into the bore 21. The vane 15 is retained between the terminal end of the coupler 18 and the shoulder 28 formed on the bulb housing 16, with the connection being such that the vane 15 is permitted to rotate. Thereafter, the ends of the vane members 15a–15c are folded up and around, as illustrated, and assembled on the upper end of the coupler 18 by extending the stud portion 22 on the coupler 18 through the holes 30a, 30b and 30c in the vane members 15a–15c. The end cap 24 then is affixed on the stud portion 22. In assembling the vane 15 on the end of the shaft 12, the vane 15 is placed on the bulb housing 16 so that the reflective surface on it is directed towards the light bulb 25, when the vane members 15a–15c are folded over and affixed in the manner described. Accordingly, with this construction, it can be seen that the flashing beacon can be packaged and shipped in a knocked-down configuration and thereafter easily and quickly assembled by the purchaser.

When the flashing beacon 10 is affixed to a wheeled vehicle such as the bicycle 11, as the bicycle is pedaled down the street, the air molecules which are imposed on the vane 15 will cause the latter to rotate. As the vane members 15a–15c rotate, they cause the light to be emitted by the light bulb 25 to flash, as the emitted light is reflected off of the reflective surface on the vane members 15a–15c.

In order to operate in this described fashion, the vane 15 must have an odd number of vane members. Furthermore, the vane shape is developed such that when it is bent into shape, the tension causes the shape to be elliptic to provide the optical property to focus all rays of light to a center, in this case, to the light source. This produces the "flash" effect as opposed to a "flickering" caused by straight revolution.

As indicated above, the flashing beacon functions as a decorative ornament for the bicycle and also as a safety device, particularly when riding the bicycle at night.

An ON/OFF switch 27 can be advantageously provided on the battery housing 15, to turn the light bulb 25 off when the flashing beacon 10 is not to be used. Also, additional lengths of the shaft 12 can be provided together with a coupler for coupling them together, for extending the length of the shaft 12 to a desired length. In such a case, of course, sufficient length of electrical conductors 26 must be provided to couple the source of power contained within the battery housing 14 to the light bulb 25.

While the principles of the invention have been described in connection with specific apparatus, it is to be clearly understood that this description is made only by way of example and not as a limitation to the scope of the invention.

Now that the invention has been described, what is claimed as new and desired to be secured by Letters Patent is:

1. An impulse operating flashing beacon comprising:
   a. an elongated shaft;
   b. an elliptically shaped vane;
   c. a source of light;
   d. a bulb housing on the one end of said elongated shaft adapted to support said source of light, and a coupler formed to receive said source of light therein and to rotatably receive and support said vane;
   e. said bulb housing having a reduced diameter portion terminating to form a shoulder on said bulb housing, said coupler having an axial bore in one end thereof proportioned to frictionally receive said reduced diameter portion therein to secure said coupler to said bulb housing and a stud portion on the opposite end thereof, said vane being formed of sheet material which is cut to form an odd number of radially extended vane members extending about an axially located mounting hole and a mounting hole in the opposed ends of each of said vane members, said vane being rotatably supported on said end of said shaft by extending said reduced diameter portion on said bulb housing through said axially located mounting hole, securing said coupler to said reduced diameter portion with said vane secured between said shoulder on said bulb housing and the end of said coupler, said radially extending vane members being folded around and said stud portion being extended through said mounting holes therein, the tension on folding said vane members causing the shape to be elliptic, and means for securing the ends of said vane members in position on said stud portion.

2. The impulse operating flashing beacon of claim 1, further including attachment means for attaching said beacon to a wheeled vehicle whereby said vehicle upon being moved causes air molecules to be impinged on said vane to rotate it.

3. The impulse operating flashing beacon of claim 2, wherein the arrangement is such that said vane can be packaged and shipped knocked down, and assembled by affixing it to said bulb housing and coupler.

4. The impulse operating flashing beacon of claim 1, wherein said vane is formed of plastic sheet material having a reflective surface deposited on one side thereof and colored on the other side for day light attention attraction.

5. The impulse operating flashing beacon of claim 1, further including a source of power for said source of light coupled to one end of said shaft, said shaft being hollow, electrical conductor means extending from said source of power through said hollow shaft for coupling said source of power to said source of light.

6. An impulse operating flashing beacon comprising: an elongated shaft; a vane formed of sheet material which is reflective and is cut to form an odd number of radially extending vane members extending about an axially located mounting hole and a mounting hole in the opposed ends of each of said vane members; a bulb housing on one end of said elongated shaft adapted to support a source of light; a reduced diameter portion on said bulb housing forming a shoulder; a coupler having an axial bore in one end thereof proportioned to frictionally receive said reduced diameter portion therein to secure said coupler to said bulb housing and a stud portion on the opposite end thereof, said vane being formed of sheet material which is cut to form an odd number of radially extended vane members extending about an axially located mounting hole; a mounting hole in the opposed ends of each of said vane members; said vane being rotatably supported on said end of said shaft by extending said reduced diameter portion on said bulb housing through said axially located mounting hole; securing said coupler to said reduced diameter portion on said bulb housing through said axially located mounting hole; securing said coupler to said reduced diameter portion with said vane secured for rotation between said shoulder on said bulb housing and the end of said coupler; said radially extending vane members being folded around and said stud portion being extended through said mounting holes therein, the tension on folding said vane members causing the shape to be elliptic with a source of light disposed within said bulb housing disposed at the center of the ellipse to thereby provide the optical property to reflect and to focus all rays of light from the source of light to a center; and means for securing for rotation the ends of said vane members in position on said stud portion; whereby a flashing effect is produced when the vane is caused to rotate with respect to the bulb housing on reaction with air molecules impinged upon it.

* * * * *